(12) United States Patent
Murata et al.

(10) Patent No.: US 6,718,134 B2
(45) Date of Patent: Apr. 6, 2004

(54) AF AUXILIARY LIGHT PROJECTOR FOR AF CAMERA

(75) Inventors: Masayuki Murata, Saitama (JP); Isamu Hirai, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/160,227

(22) Filed: Jun. 4, 2002

(65) Prior Publication Data

US 2002/0186971 A1 Dec. 12, 2002

(30) Foreign Application Priority Data

Jun. 7, 2001 (JP) ........................................ 2001-172284

(51) Int. Cl.⁷ ................................................. G03B 3/00
(52) U.S. Cl. ........................................ 396/106; 396/108
(58) Field of Search ................................. 396/106, 108, 396/109; 250/201.4

(56) References Cited

U.S. PATENT DOCUMENTS

| | | |
|---|---|---|
| 4,771,308 A | 9/1988 | Tejima et al. |
| 4,870,442 A | 9/1989 | Tejima et al. |
| 4,905,034 A | 2/1990 | Tejima et al. |
| 4,949,115 A | 8/1990 | Tejima et al. |
| 4,958,180 A | 9/1990 | Matsui et al. |
| 5,459,551 A | * 10/1995 | Suzuki et al. ................ 396/106 |

FOREIGN PATENT DOCUMENTS

JP    2625722    4/1997

* cited by examiner

Primary Examiner—Russell Adams
Assistant Examiner—Arthur A Smith
(74) Attorney, Agent, or Firm—Greenblum & Bernstein, P.L.C.

(57) ABSTRACT

An AF auxiliary light projector for an AF camera includes a focus detection optical system having a first optical axis, and an AF auxiliary light projecting optical system having a second optical axis which intersects the first optical axis, the AF auxiliary light projecting optical system projecting an image having a predetermined contrast pattern onto an object. The AF auxiliary light projecting optical system includes a projector lens, a contrast pattern chart, an illumination lens, and an illumination light source, in that order. The illumination lens has an asymmetrical optical power so that an optical power of a far distance portion of the illumination lens for a far distance region of the contrast pattern chart is greater than an optical power of a near distance portion of the illumination lens for a near distance region of the contrast pattern chart.

9 Claims, 5 Drawing Sheets

AF AUXILIARY LIGHT PROJECTOR FOR AF CAMERA

BACKGROUND OF THE INVENTION

1. Field of the Invention

The present invention relates to an AF auxiliary light projector for a camera having an autofocus system.

2. Description of the Related Art

Some SLR cameras and camcorders which incorporate a passive autofocus system are provided with an AF auxiliary light projector which emits an auxiliary light beam with a predetermined contrast pattern (e.g., a pattern of stripes) toward the object in low-light or low contrast situations to aid the autofocus system. It is desirable for the AF auxiliary light coverage to range from a near distance range to a far distance range. However, it is difficult to give a sufficient amount of AF auxiliary light to the object at a far distance since the light amount decreases as the AF auxiliary light projector is farther from the object. In AF cameras in which a distance measuring zone can be freely set within a photographing range and in AF cameras in which focus information is obtained from each of different distance measuring zones within a photographing range, the light projection area of the AF auxiliary light is desirably large. To increase the light projection area of the AF auxiliary light, it is conventionally the case that a large contrast pattern chart for forming the aforementioned predetermined contrast pattern is used, or that a contrast-pattern projecting lens having a short focal length is used. However, a large contrast pattern chart has to be illuminated if used for forming the predetermined contrast pattern, which leads to an increase in size of the illuminating lens system. In the case where a contrast-pattern projecting lens having a short focal length is used, the projection scaling factor of the contrast pattern increases to thereby decrease the amount of the AF auxiliary light projected onto the object, which inevitably decreases the performance of the AF system for far distance objects.

SUMMARY OF THE INVENTION

The present invention has been devised in view of the problems noted above, and accordingly, the present invention provides a compact AF auxiliary light projector wherein the AF auxiliary light coverage ranges from a near distance range to a far distance range.

For example, an AF auxiliary light projector for an AF camera is provided, including a focus detection optical system having a first optical axis, and an AF auxiliary light projecting optical system having a second optical axis which intersects the first optical axis, the AF auxiliary light projecting optical system projecting an image having a predetermined contrast pattern onto a photographic object. The AF auxiliary light projecting optical system includes a projector lens, a contrast pattern chart for forming the predetermined contrast pattern, an illumination lens, and an illumination light source, in that order from an intersection between the first optical axis and the second optical axis. The illumination lens is formed having an asymmetrical optical power so that an optical power of a far distance portion of the illumination lens for a far distance region in a projection region of the contrast pattern chart is greater than an optical power of a near distance portion of the illumination lens for a near distance region in the projection region of the contrast pattern chart.

It is desirable for the illumination lens to be formed so as to satisfy the following condition:

$hN/hF > 1.2$; wherein "hN" designates a height of a first light ray from the second optical axis which is passed through the contrast pattern chart upon being emitted from the illumination light source to be incident on the near distance portion of the illumination lens at a first angle defined between the second optical axis and the first light ray; and "hF" designates a height of a second light ray from the second optical axis which is passed through the contrast pattern chart when the second light ray is emitted from the illumination light source to be incident on the far distance portion of the illumination lens at a second angle defined between the second optical axis and the second light ray, the absolute value of the second angle being the same as the absolute value of the first angle, and the angular orientation of the second angle being opposite to the angular orientation of the first angle.

It is desirable for an angle of inclination of the second optical axis relative to the first optical axis and an angle of inclination of the contrast pattern chart relative to the second optical axis be determined so that a conjugate image of the contrast pattern chart is formed on a plane extending in a direction substantially parallel to the first optical axis.

It is desirable for the focus detection optical system to be provided as a multi-zone focus detection optical system for obtaining focus information from each of a plurality of different detection zones.

The illumination light source can be provided as a plurality of illumination light sources, and the illumination lens can be formed as a combination of a plurality of condenser lenses which condense light bundles emitted from the plurality of illumination light sources, respectively.

In another embodiment, an AF auxiliary light projector for an AF camera is provided, including a focus detection optical system having a first optical axis, and an AF auxiliary light projecting optical system having a second optical axis which intersects the first optical axis, the AF auxiliary light projecting optical system projecting an image having a predetermined contrast pattern onto a photographic object. The AF auxiliary light projecting optical system includes a projector lens, a contrast pattern chart for forming the predetermined contrast pattern, an illumination lens, and an illumination light source, in that order from an intersection between the first optical axis and the second optical axis. At least one of front and rear surfaces of the illumination lens is decentered from the second optical axis so that a luminous intensity of a far distance region in a projection region of the contrast pattern chart becomes greater than a luminous intensity of a near distance region in the projection region of the contrast pattern chart.

It is desirable for an angle of inclination of the second optical axis relative to the first optical axis and an angle of inclination of the contrast pattern chart relative to the second optical axis be determined so that a conjugate image of the contrast pattern chart is formed on a plane extending in a direction substantially parallel to the first optical axis.

It is desirable for the focus detection optical system to be provided as a multi-zone focus detection optical system for obtaining focus information from each of a plurality of different detection zones.

The illumination light source can be provided as a plurality of illumination light sources, and the illumination lens can be formed as a combination of a plurality of condenser lenses which condense light bundles emitted from the plurality of illumination light sources, respectively.

The present disclosure relates to subject matter contained in Japanese Patent Application No. 2001-172284 (filed on Jun. 7, 2001) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
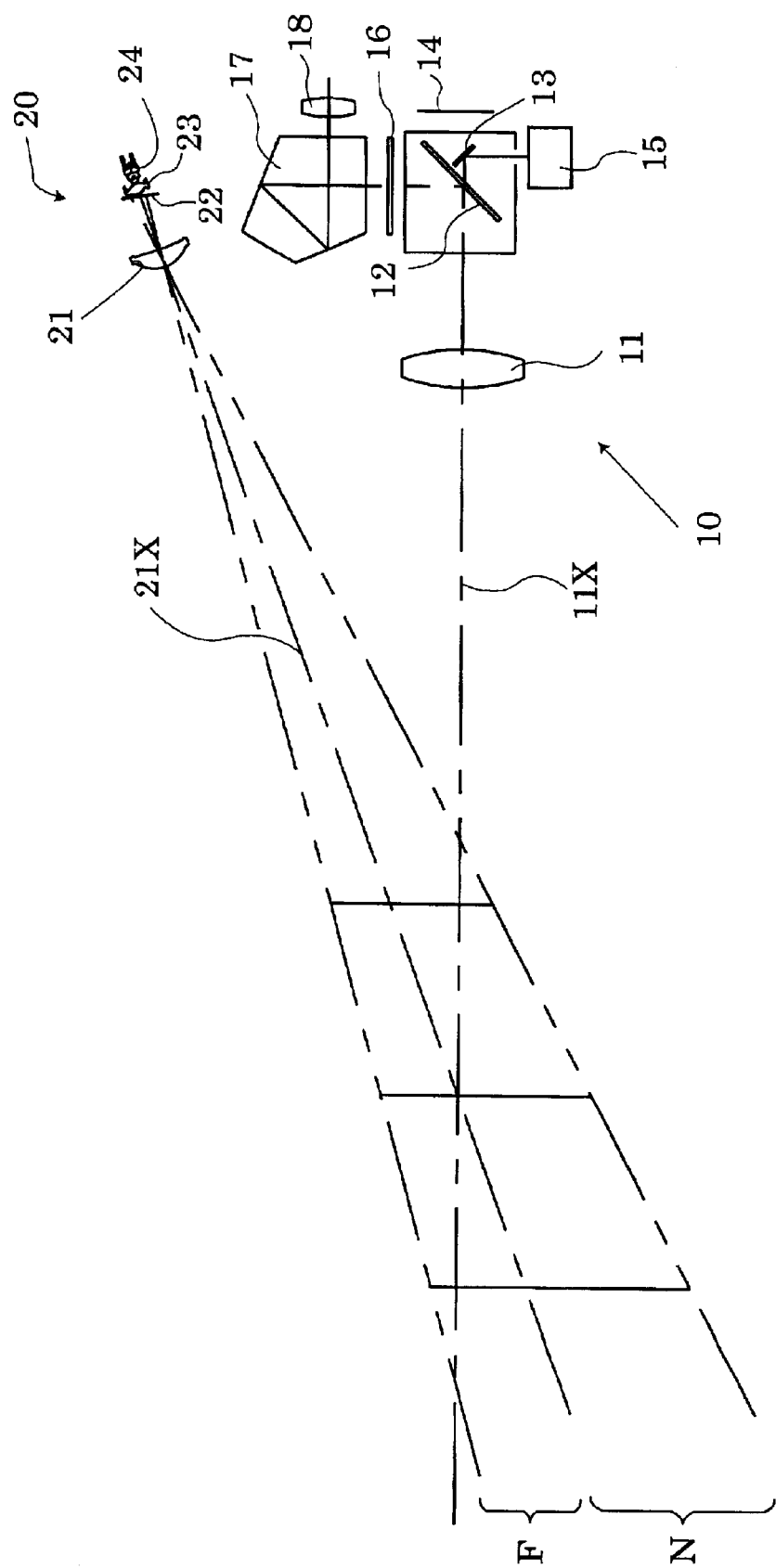
FIG. 1 is a side elevational view of fundamental optical elements of an AF SLR camera which incorporates an embodiment of an AF auxiliary light projector according to the present invention.

As shown in FIG. 1, an AF SLR camera 10 is provided with a photographing optical system 11 having an optical axis 11X. The camera 10 is provided on the optical axis 11X with a main mirror (quick-return mirror) 12, a sub-mirror 13 and a focal plane (film plane/imaging surface) 14, in that order from the photographing optical system 11. The main mirror 12 is provided at a center thereof with a half mirror portion so that the light passing therethrough is incident on the sub-mirror 13 to be reflected thereby downwards to enter a focus detection optical system 15. The main mirror 12 retracts from an optical path of the photographing optical system 11 at a time of exposure so that the object image formed through the photographing optical system 11 is focused on the focal plane 14.

The camera 10 is provided above the main mirror 12 with a focusing screen 16 optically conjugate to the focal plane 14. The camera 10 is provided above the focusing screen 16 with a pentagonal prism (or a hollow pentagonal mirror) 17. The camera 10 is provided with an eyepiece 18 on an optical path of light emerging from an exit surface of the pentagonal prism 17,. The object image formed on the focusing screen 16 is viewed through the eyepiece 18.

Figure 6:
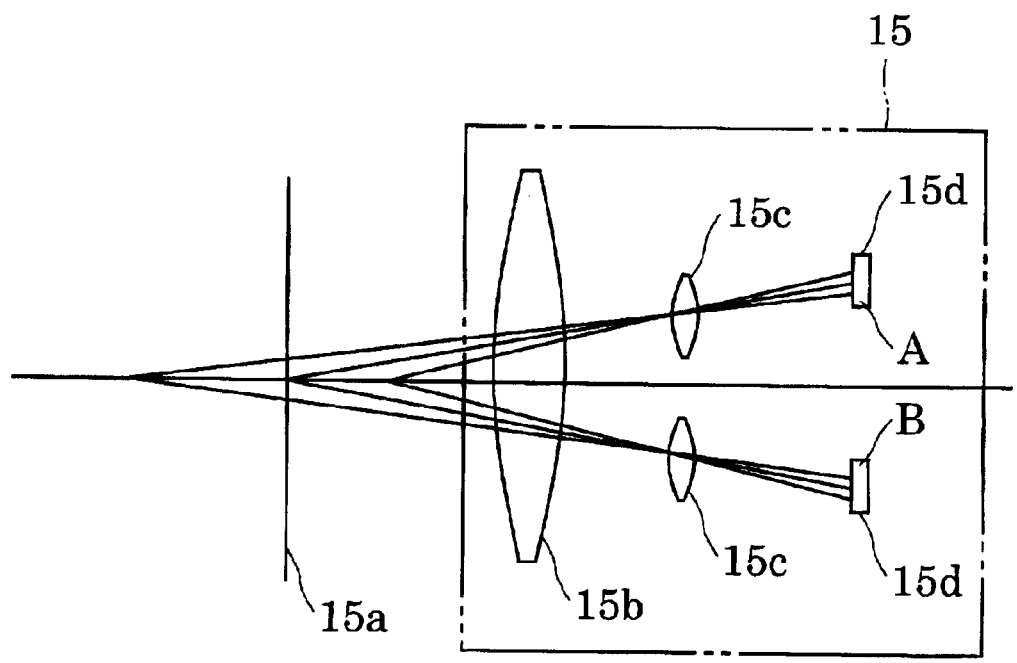
FIG. 6 is a conceptual diagram of a focus detection optical system by way of example.
Figure 7:
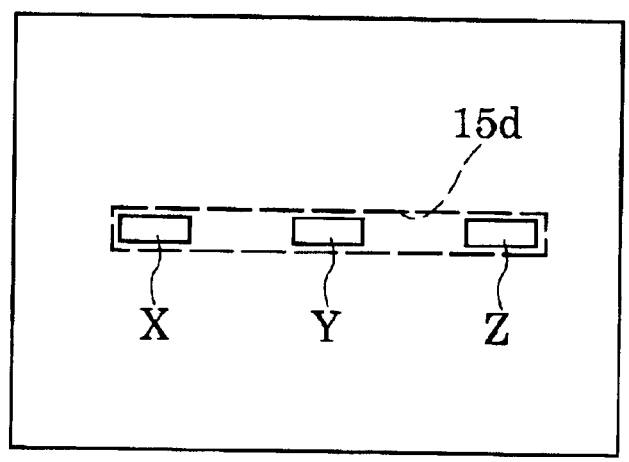
FIG. 7 is a schematic diagram of a picture plane in which three detection zones of a multi-zone focus detection optical system are arranged, showing an example of an arrangement of the detection zones in the picture plane.

The focus detection optical system 15 is a passive autofocus system (phase-difference focus detection optical system). FIG. 6 shows a conceptual diagram of the focus detection optical system 15. Between the sub-mirror 13 and the focus detection optical system 15 is formed a reference focal plane 15a which is located at a position optically equivalent to the position of the focal plane 14. The focus detection optical system 15 detects the focus state (amount of defocus such as front or rear focus) on the reference focal plane 15a. The focus detection optical system 15 includes a condenser lens 15b, a pair of separator lenses 15c, and a pair of line sensors (e.g., multi segment CCD sensors) 15d located behind the respective separator lenses 15c. The image formed on the reference focal plane 15a is separated into two images by the pair of separator lenses 15c to be respectively formed on the pair of line sensors 15d. Each of the pair of line sensors 15d includes an array of photoelectric converting elements. Each photoelectric converting element converts the received light of an image into electric charges which are integrated (accumulated), and outputs an integrated electric charge as a pixel signal (voltage) to a CPU (not shown) of the camera 10. Each line sensor 15d is provided in a rectangular picture plane with a plurality of detection zones, specifically three separate detection zones X, Y and Z as shown in FIG. 7 in this particular embodiment, so that focus information (defocus information) can be obtained from each of the three different detection zones X, Y and Z. Immediately after the value of the integrated electric charge output from one of the array of photoelectric converting elements reaches a predetermined value (integration completion value), the CPU stops the integrating operations of all the photoelectric converting elements of the pair of line sensors 15d, and subsequently inputs all integrated electric charges (pixel data) from the photoelectric converting elements of the pair of line sensors 15d simultaneously. The CPU calculates an amount of defocus through a predetermined defocus operation in accordance with data input from the pair of line sensors 15d. In an autofocus operation, the CPU drives a focusing lens (not shown) of the photographing optical system 11 by a conventional drive system to bring the object image into focus in accordance with the calculated amount of defocus.

Figure 2:
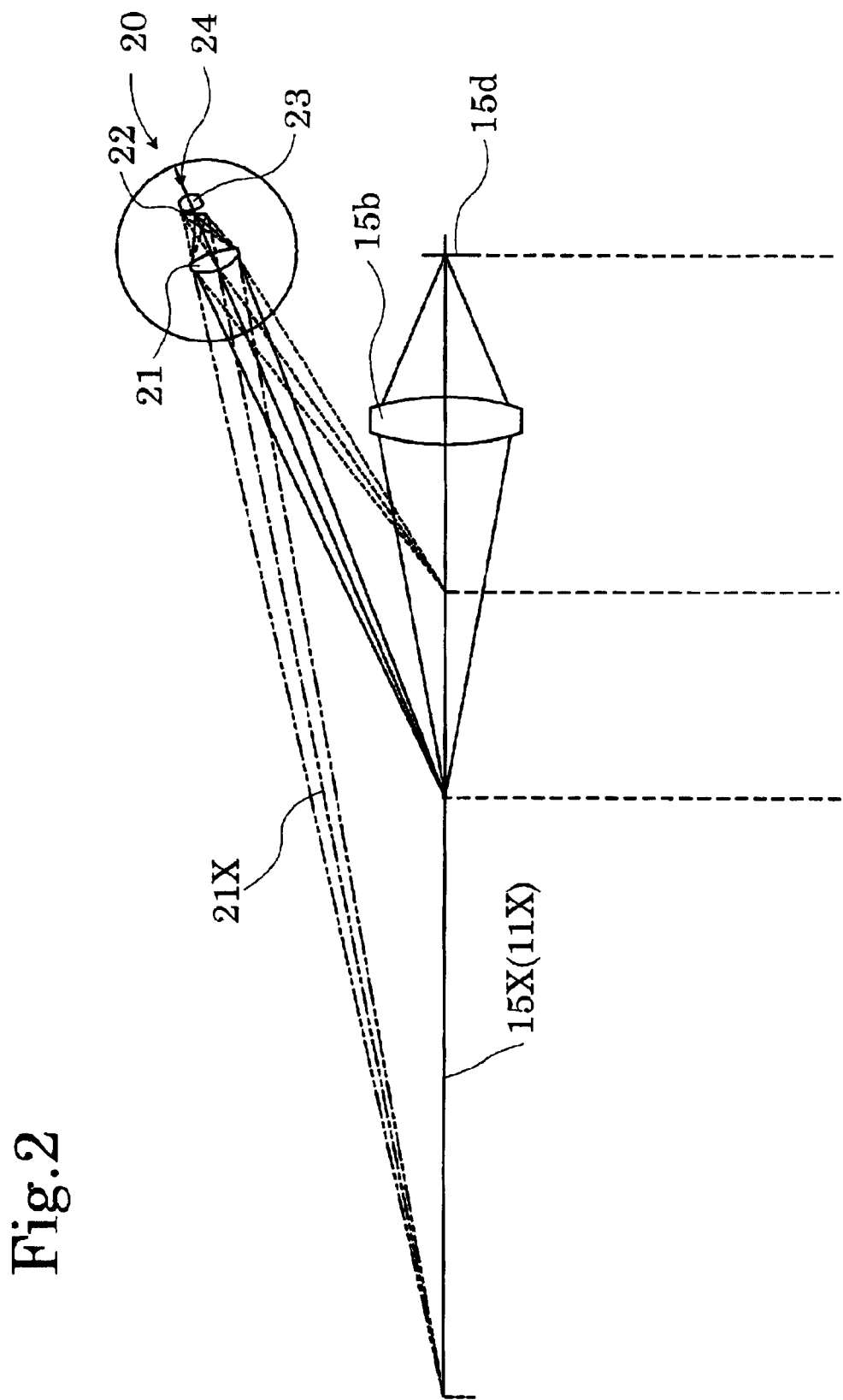
FIG. 2 is a side elevational view of the AF auxiliary light projector and a condenser lens of a focus detection optical system incorporated in the AF SLR camera, showing a positional relationship between the optical axis of the focus detection optical system and the optical axis of a projector lens of the AF auxiliary light projector.
Figure 3:
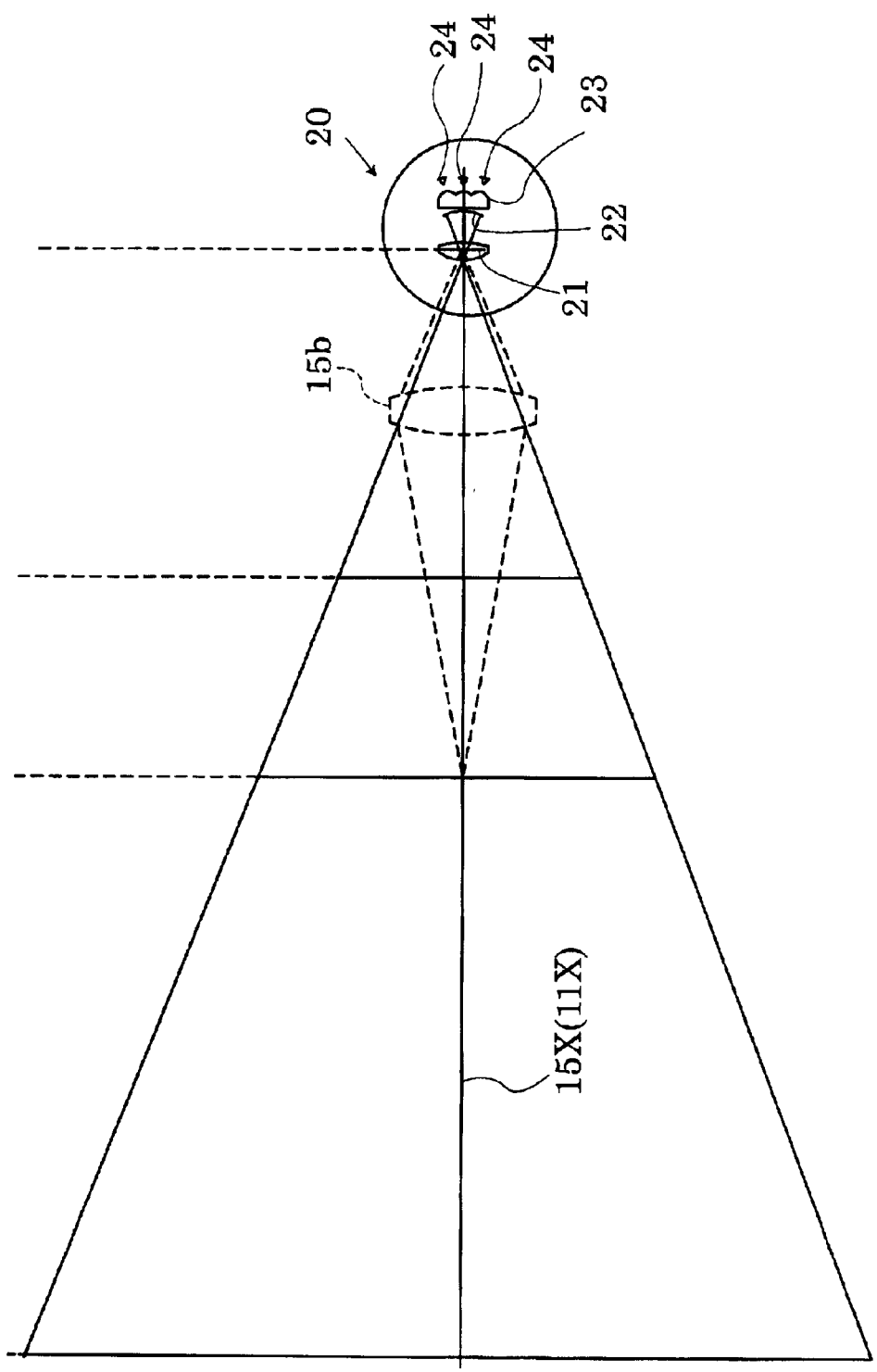
FIG. 3 is a plan view of the AF auxiliary light projector and the condenser lens shown in FIG. 2.
Figure 4:
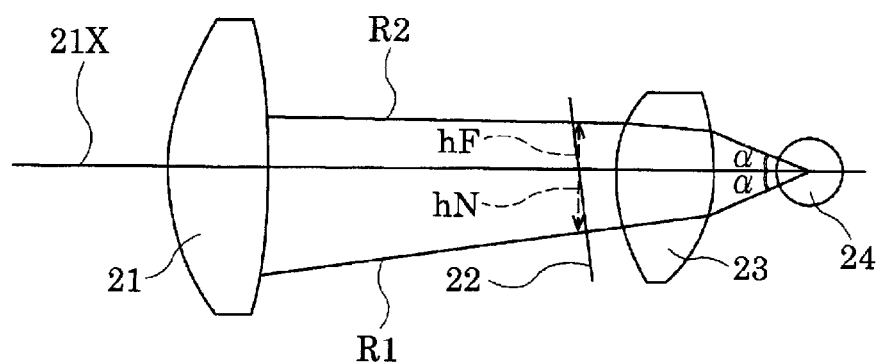
FIG. 4 is an enlarged side elevational view of fundamental elements of the embodiment of the AF auxiliary light projector shown in FIG. 1.
Figure 5:
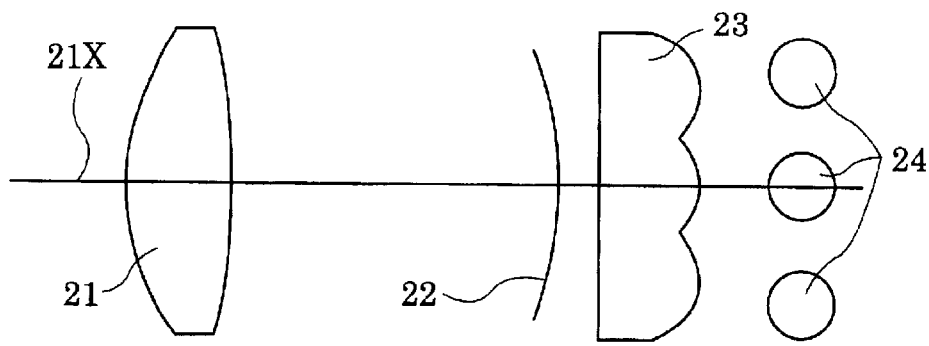
FIG. 5 is an enlarged plan view of the fundamental elements of the embodiment of the AF auxiliary light projector shown in FIG. 4.

The camera 10 is provided above the pentagonal prism 17 with an AF auxiliary light projecting optical system (AF auxiliary light projector) 20. As shown in FIGS. 1 through 3, the AF auxiliary light projecting optical system 20 is provided with a projector lens 21, the optical axis 21X of which intersects the optical axis 11X of the photographing optical system 11. As shown in FIGS. 4 and 5, a contrast pattern chart (contrast pattern forming sheet) 22 for forming a predetermined contrast pattern, an illumination lens (multiple condenser lens) 23 and three illumination light sources (e.g., LEDs) 24 are provided behind the projector lens 21 in that order. The contrast pattern chart 22 is provided with parallel light permissible and non-permissible strips, through which a pattern of strips are projected onto the object in low-light or low contrast situations to aid the autofocus system. The angle of inclination of the optical axis 21X of the projector lens 21 relative to the optical axis 11X of the photographing optical system 11, and also the angle of inclination of the contrast pattern chart 22 relative to the optical axis 21X of the projector lens 21 are determined so that a conjugate image of the contrast pattern chart 22 is formed on a plane extending in a direction substantially parallel to the optical axis 11X of the photographing optical system 11 and perpendicular to the page of FIGS. 1 and 2. Specifically, based on Scheimpflug's principle, a plane which passes through a principal point of the projector lens 21 and extends perpendicular to the optical axis 21X of the projector lens 21 intersects with an extension line (plane) of the contrast pattern chart 22 at a point on the optical axis 11X of the photographing optical system 11.

In FIGS. 2 and 3, the optical axis 15X of the condenser lens 15b (i.e., the optical axis of the focus detection optical system 15) is shown instead of the optical axis 11X of the photographing optical system 11. The optical axis 11X of the photographing optical system 11 is coincident with the optical axis 15X of the condenser lens 15b. As shown in FIGS. 3 and 5, the three illumination light sources 24 are arranged so that the illumination light emitted therefrom broadens horizontally to cover a horizontally elongated photographic picture plane. The illumination lens 23 is formed as a combination of three condenser lenses which condense the light bundles emitted from the three illumination light sources 24, respectively.

The AF auxiliary light projector having the above described structure is characterized in that the illumination lens 23 is formed so that an optical power thereof is asymmetrical with respect to the optical axis 21X of the projector lens 21 as shown in FIG. 4, and so that an optical power of a far distance portion (upper portion as viewed in FIG. 4) of the illumination lens 23 for a far distance region F (see FIG. 1) in the projection region of the contrast pattern chart 22 is greater than an optical power of a near distance portion (lower portion as viewed in FIG. 4) of the illumination lens 23 for a near distance region N (see FIG. 1) in the projection region of the contrast pattern chart 22 in order to increase the luminous intensity for the far distance region F. This lens setting for increasing the luminous intensity for the far distance region F can be determined by the shape (including the shape of an aspheric surface) of the incident surface and/or the exit surface of the illumination lens 23. Alternatively, the lens setting can be determined by forming the incident surface or the exit surface of the illumination lens 23 as a decentered surface.

If the illumination lens 23 is formed so that an optical power of the far distance portion of the illumination lens 23 for the far distance region F in the projection region of the contrast pattern chart 22 is greater than that for the near distance region N in the same projection region in the aforementioned manner, focus information (defocus information) is obtained via the focus detection optical system 15 more easily for a far distance object since a magnified image of a predetermined contrast pattern with a high luminous intensity can be projected onto the far distance object. On the other hand, an AF auxiliary light projector wherein the AF auxiliary light coverage ranges from a near distance range to a far distance range as a whole is achieved since focus information (defocus information) is obtained for the near distance object even with a magnified image of a predetermined contrast pattern with a low luminous intensity.

It is desirable for the asymmetrical optical power of the illumination lens 23 to be determined to satisfy the following condition:

hN/hF>1.2; wherein "hN" represents the height of a light ray R1 from the optical axis 21X which is passed through the contrast pattern chart 22 upon being emitted from the illumination light source 24 to be incident on the near distance portion (lower portion as viewed in FIG. 4) of the illumination lens 23 at an angle α (see FIG. 4) between the optical axis 21X of the projector lens 21 and the light ray R1; and "hF" represents the height of a light ray R2 from the optical axis 21X which is passed through the contrast pattern chart 22 upon being emitted from the illumination light source 24 to be incident on the far distance portion (upper portion as viewed in FIG. 4) of the illumination lens 23 at the same angle α (i.e., the absolute value thereof is identical to the former angle α but the angular orientation thereof is opposite to the former angle α) between the optical axis 21X of the projector lens 21 and the light ray R2.

The above condition (hN/hF>1.2) defines the height of the light beam at the location of the contrast pattern chart 22, and shows a specific ratio of the optical power of the near distance portion of the illumination lens 23 for illuminating a near distance portion of the contrast pattern chart 22 to the optical power of the far distance portion of the illumination lens 23 for illuminating a far distance portion of the contrast pattern chart 22. The luminous intensity for the far distance region F can be increased by satisfying the above condition. In the case where "hN/hF" is equal to or smaller than 1.2, the amount of effective light beam projected toward the far distance portion of the chart illumination area decreases if the optical power of the near distance portion of the illumination lens 23 for illuminating the near distance portion of the chart illumination area is determined so as to secure a sufficient illumination area.

Figure 8:
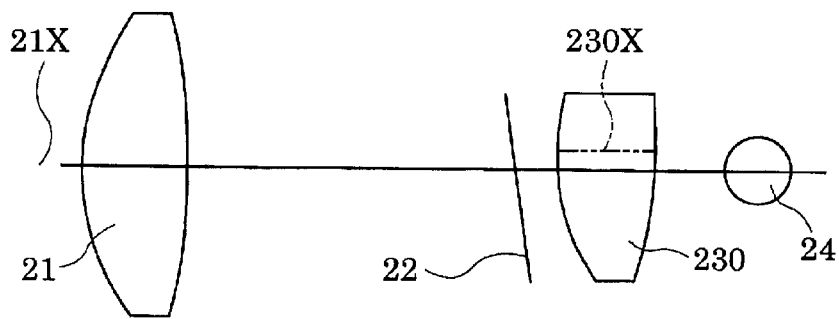
FIG. 8 is a view similar to that of FIG. 4 and illustrates another embodiment of the AF auxiliary light projector.
Figure 9:
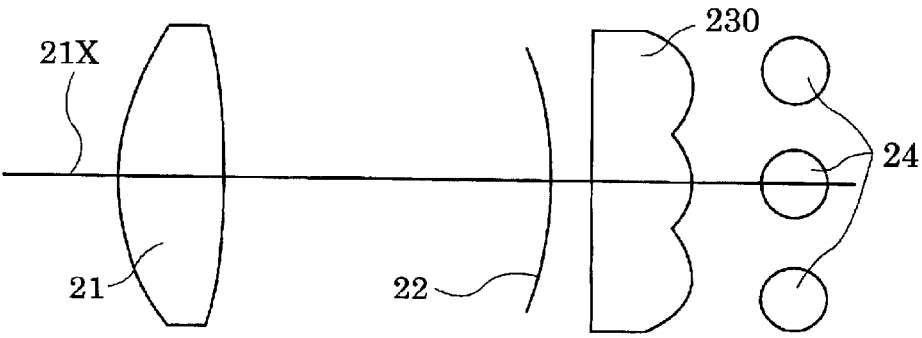
FIG. 9 is an enlarged plan view of the fundamental elements of the embodiment of the AF auxiliary light projector shown in FIG. 8.

FIGS. 8 and 9 show another embodiment of the AF auxiliary light projector according to the present invention. In this embodiment, an illumination lens 230 corresponding to the illumination lens 23 of the previous embodiment is provided between the contrast pattern chart 22 and the illumination light source 24 so that an optical axis 230X of the illumination lens 230 is decentered from the optical axis 21X of the projector lens 21 to make the luminous intensity of the far distance portion of the contrast pattern chart 22 greater than the luminous intensity of the near distance portion of the contrast pattern chart 22. Although each of the front and rear surfaces of the illumination lens 230 is decentered from the optical axis 21X of the projector lens 21 in the illustrated embodiment shown in FIGS. 8 and 9, a similar effect can be obtained with an illumination lens with only one of the front and rear surfaces thereof being decentered from the optical axis 21X of the projector lens 21.

The AF auxiliary light projector according to the present invention can be incorporated into an AF camera, or provided as an external device which is attached to an AF camera.

As can be understood from the above description, a compact and simple AF auxiliary light projector is achieved wherein the AF auxiliary light coverage ranges from a near distance range to a far distance range.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An AF auxiliary light projector for an AF camera comprising a focus detection optical system having a first optical axis, and an AF auxiliary light projecting optical system having a second optical axis which intersects said first optical axis, said AF auxiliary light projecting optical system projecting an image having a predetermined contrast pattern onto a photographic object, wherein said AF auxiliary light projecting optical system comprises a projector lens, a contrast pattern chart for forming said predetermined contrast pattern, an illumination lens, and an illumination light source, in that order from an intersection between said first optical axis and said second optical axis; and wherein said illumination lens is formed having an asymmetrical optical power so that an optical power of a far distance portion of said illumination lens for a far distance region in a projection region of said contrast pattern chart is greater than an optical power of a near distance portion of said illumination lens for a near distance region in said projection region of said contrast pattern chart.

2. The AF auxiliary light projector according to claim 1, wherein said illumination lens is formed to satisfy the following condition:

hN/hF>1.2;

wherein "hN" designates a height of a first light ray from said second optical axis which is passed through said contrast pattern chart upon being emitted from said illumination light source to be incident on said near distance portion of said illumination lens at a first angle defined between said second optical axis and said first light ray; and wherein "hF" designates a height of a second light ray from said second optical axis which is passed through said contrast pattern chart when said second light ray is emitted from said illumination light source to be incident on said far distance portion of said illumination lens at a second angle defined between said second optical axis and said second light ray, the absolute value of said second angle being the same as the absolute value of said first angle, and the angular orientation of said second angle being opposite to the angular orientation of said first angle.

3. The AF auxiliary light projector according to claim 1, wherein an angle of inclination of said second optical axis relative to said first optical axis and an angle of inclination of said contrast pattern chart relative to said second optical axis are determined so that a conjugate image of said contrast pattern chart is formed on a plane extending in a direction substantially parallel to said first optical axis.

4. The AF auxiliary light projector according to claim 1, wherein said focus detection optical system comprises a multi-zone focus detection optical system for obtaining focus information from each of a plurality of different detection zones.

5. The AF auxiliary light projector according to claim 4, wherein said illumination light source comprises a plurality of illumination light sources, and wherein said illumination lens is formed as a combination of a plurality of condenser lenses which condense light bundles emitted from said plurality of illumination light sources, respectively.

6. An AF auxiliary light projector for an AF camera comprising a focus detection optical system having a first optical axis, and an AF auxiliary light projecting optical system having a second optical axis which intersects said first optical axis, said AF auxiliary light projecting optical system projecting an image having a predetermined contrast pattern onto a photographic object, wherein said AF auxiliary light projecting optical system comprises a projector lens, a contrast pattern chart for forming said predetermined contrast pattern, an illumination lens, and an illumination light source, in that order from an intersection between said first optical axis and said second optical axis; and wherein at least one of front and rear surfaces of said illumination lens is decentered from said second optical axis so that a luminous intensity of a far distance region in a projection region of said contrast pattern chart becomes greater than a luminous intensity of a near distance region in said projection region of said contrast pattern chart.

7. The AF auxiliary light projector according to claim 6, wherein an angle of inclination of said second optical axis relative to said first optical axis and an angle of inclination of said contrast pattern chart relative to said second optical axis are determined so that a conjugate image of said contrast pattern chart is formed on a plane extending in a direction substantially parallel to said first optical axis.

8. The AF auxiliary light projector according to claim 6, wherein said focus detection optical system comprises a multi-zone focus detection optical system for obtaining focus information from each of a plurality of different detection zones.

9. The AF auxiliary light projector according to claim 8, wherein said illumination light source comprises a plurality of illumination light sources, and wherein said illumination lens is formed as a combination of a plurality of condenser lenses which condense light bundles emitted from said plurality of illumination light sources, respectively.

* * * * *